US011988424B2

(12) United States Patent
Cho et al.

(10) Patent No.: US 11,988,424 B2
(45) Date of Patent: May 21, 2024

(54) DEVICE HAVING REFRIGERANT CYCLE (71) Applicant: LG ELECTRONICS INC., Seoul (KR)

(72) Inventors: Eunjun Cho, Seoul (KR); Minsoo Kim, Seoul (KR); Hojin Seo, Seoul (KR); Dongkeun Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 17/836,133

(22) Filed: Jun. 9, 2022

(65) Prior Publication Data

US 2022/0404076 A1 Dec. 22, 2022

(30) Foreign Application Priority Data

Jun. 22, 2021 (KR) .......................... 10-2021-0080729

(51) Int. Cl.
*F25B 43/00* (2006.01)
*F25B 41/40* (2021.01)

(52) U.S. Cl.
CPC ............ *F25B 43/006* (2013.01); *F25B 41/40* (2021.01); *F25B 2400/04* (2013.01);
(Continued)

(58) Field of Classification Search
CPC ........ F25B 43/006; F25B 41/20; F25B 41/40; F25B 41/42; F25B 2400/04;
(Continued)

(56) References Cited

U.S. PATENT DOCUMENTS

2002/0069654 A1* 6/2002 Doi ....................... F25D 17/065
62/199
2020/0149751 A1 5/2020 Cho et al.
2020/0318870 A1 10/2020 Cho et al.

FOREIGN PATENT DOCUMENTS

CN 1888743 1/2007
CN 101737329 6/2010
(Continued)

OTHER PUBLICATIONS

Chinese Office Action issued in Application No. 202210592371.8 dated May 11, 2023.
(Continued)

*Primary Examiner* — Miguel A Diaz
(74) *Attorney, Agent, or Firm* — KED & ASSOCIATES (57) ABSTRACT

A device is provided that may include a compressor configured to compress a refrigerant, a condenser configured to condense the compressed refrigerant, an expander configured to expand the refrigerant condensed by the condenser, an evaporator configured to evaporate the refrigerant expanded by the expander, a separation mechanism connected to an outlet pipe of the evaporator to separate liquid refrigerant and gaseous refrigerant discharged from the evaporator, a bypass pipe to guide the gaseous refrigerant separated from the liquid refrigerant to the compressor, a first pipe connected to the separation mechanism and through which the liquid refrigerant discharged from the separation mechanism flows, an accumulator connected to the first pipe to separate the gaseous refrigerant, which is not separated from the liquid refrigerant by the separation mechanism, from the liquid refrigerant and discharge the separated gaseous refrigerant, and a second pipe configured to guide the gaseous refrigerant discharged from the accumulator to the compressor.

12 Claims, 9 Drawing Sheets

(52) U.S. Cl.
CPC ....... *F25B 2400/23* (2013.01); *F25B 2500/26* (2013.01); *F25B 2600/2501* (2013.01)

(58) Field of Classification Search
CPC .......... F25B 2400/0415; F25B 2400/23; F25B 2500/26; F25B 2600/2501
See application file for complete search history.

(56) References Cited

FOREIGN PATENT DOCUMENTS

| | | |
|---|---|---|
| CN | 101871676 | 10/2010 |
| CN | 103649650 | 3/2014 |
| CN | 104034099 | 9/2014 |
| CN | 105716307 | 6/2016 |
| CN | 106104170 | 11/2016 |
| CN | 106885402 | 6/2017 |
| EP | 3 650 764 | 5/2020 |
| EP | 3 719 414 | 10/2020 |
| JP | H08-094213 | 4/1996 |
| JP | H08-327181 | 12/1996 |
| JP | 2000-304373 | 11/2000 |
| JP | 2013-257072 | 12/2013 |
| KR | 10-2011-0116334 | 10/2011 |
| KR | 10-2014-0146891 | 12/2014 |
| KR | 10-2018-0104416 | 9/2018 |
| KR | 10-2020-0053269 | 5/2020 |
| KR | 10-2020-0059578 | 5/2020 |

OTHER PUBLICATIONS

Korean Office Action dated Aug. 18, 2022 issued in KR Application No. 10-2021-0080729.
European Search Report dated Nov. 9, 2022 issued in EP Application No. 22175466.6.
Chinese Office Action issued in Application No. 2022105923718 dated Sep. 20, 2023.

* cited by examiner

DEVICE HAVING REFRIGERANT CYCLE

CROSS-REFERENCE TO RELATED APPLICATION(S)

The present application claims priority under 35 U.S.C. 119 and 35 U.S.C. 365 to Korean Patent Application No. 10-2021-0080729, filed in Korea on Jun. 22, 2021, which is hereby incorporated by reference in its entirety.

BACKGROUND

1. Field

A device having a refrigerant cycle is disclosed herein.

2. Background

A refrigerant cycle includes a compressor, a condenser, an expansion device, and an evaporator. As a refrigerant cycle that performs compression, condensation, expansion and evaporation of a refrigerant is driven, a temperature of a predetermined space may be lowered or raised.

A device including a refrigerant cycle may include an air conditioner or a refrigerator, for example. The air conditioner is a device for maintaining air in a predetermined space, in which the air conditioner is installed, in a most suitable state according to a use and purpose. The predetermined space may be various places in which the air conditioner is used. For example, the air conditioner may be used at home or an office.

When the air conditioner performs a cooling operation, an outdoor heat exchanger provided in an outdoor unit functions as a condenser, and an indoor heat exchanger provided in an indoor unit functions as an evaporator. On the other hand, when the air conditioner performs a heating operation, the indoor heat exchanger functions as a condenser, and the outdoor heat exchanger functions as an evaporator.

The refrigerator is a device for maintaining an internal storage compartment at a low temperature. Korean Patent Laid-Open No. 10-2011-0116334 (hereinafter, "prior art document"), which is hereby incorporated by reference, discloses a refrigerator-freezer to which a supercooling device is applied. The refrigerator-freezer of the prior art document includes a compressor, a condenser, a first heat exchanger, a first expansion device, a second heat exchanger, a second expansion device, a third expansion device, a liquid-gas separator, an evaporator, and a gas mixture pipe. The liquid-gas separator is provided at a front end of the evaporator, and a gaseous refrigerant separated by the liquid-gas separator is introduced into a supercooling device, supercooled, and then suctioned into the compressor.

When a suction pressure of the compressor is low, a discharge pressure of the compressor is lowered, thus reducing efficiency of the refrigerant cycle. In general, pressure loss may occur while the refrigerant flows from an outlet side of the evaporator to a suction side of the compressor.

In the prior art document, the gaseous refrigerant is bypassed by the liquid-gas separator at an inlet side of the evaporator, flows through the supercooling device, and is then suctioned into the compressor. When the gaseous refrigerant is bypassed by the liquid-gas separator at the inlet side of the evaporator and then suctioned into the compressor, the pressure loss of the entire refrigerant suctioned into the compressor may be reduced. However, a flow rate of the refrigerant bypassed at the inlet side of the evaporator is significantly less than a flow rate of the refrigerant passing through the evaporator and flowing into the compressor. Therefore, there is a disadvantage in that a degree of reduction in pressure loss of the refrigerant suctioned into the compressor is low.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described with reference to the accompanying drawings. It should be noted that when components in the drawings are designated by reference numerals, the same components have the same reference numerals as far as possible even though the components are illustrated in different drawings. Further, in description of embodiments, when it is determined that descriptions of well-known configurations or functions disturb understanding of the embodiments, descriptions will be omitted.

Also, in the description of the embodiments, the terms such as first, second, A, B, (a) and (b) may be used. The terms are merely used to distinguish the corresponding component from other components, and do not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 1:
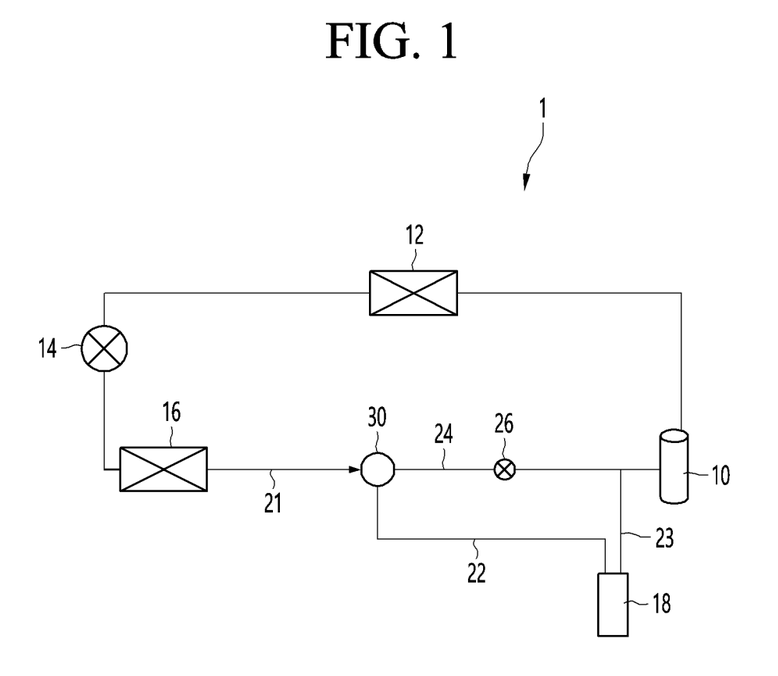
FIG. 1 is a schematic diagram of a refrigerant cycle according to an embodiment.
Figure 2:
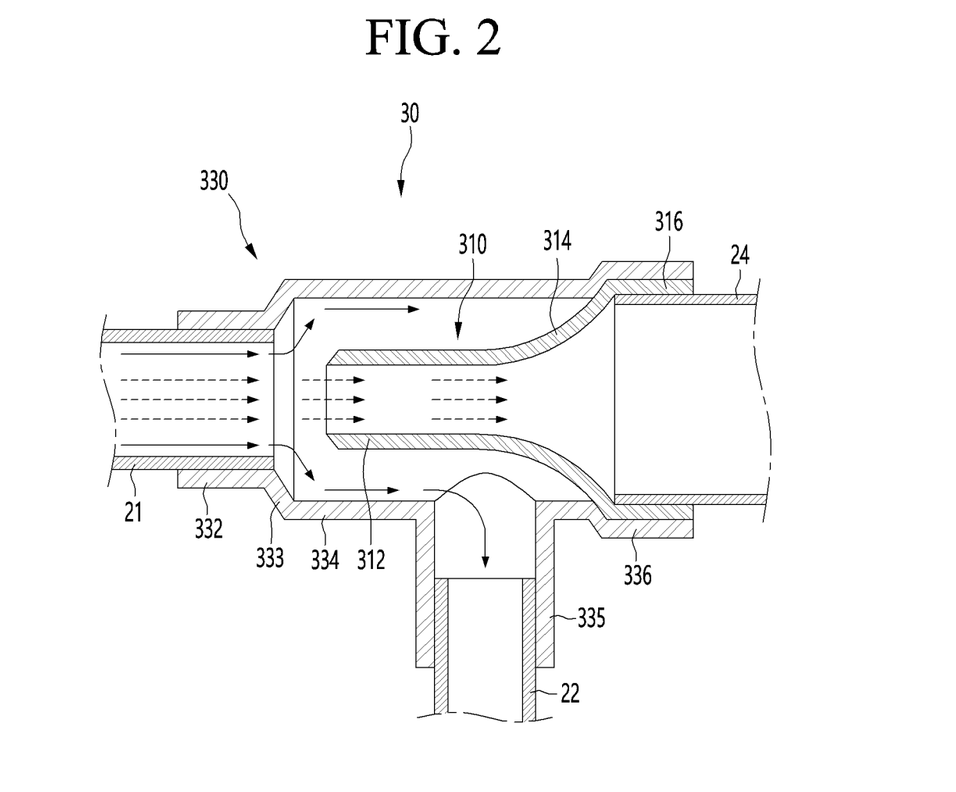
FIG. 2 is a cross-sectional view of a separation mechanism according to an embodiment.

FIG. 1 is a schematic diagram of a refrigerant cycle according to an embodiment. FIG. 2 is a cross-sectional view of a separation mechanism according to an embodiment.

Referring to FIGS. 1 and 2, a refrigerant cycle 1 according to an embodiment may include a compressor 10 configured to compress a refrigerant. The refrigerant cycle 1 may further include a condenser 12 configured to condense the refrigerant compressed by the compressor 10, an expander 14 configured to expand the refrigerant condensed by the condenser 12, and an evaporator 16 configured to evaporate the refrigerant expanded by the expander 14. The refrigerant expanded by the expander 14 may flow into the evaporator 16 as a liquid refrigerant, and may be phase-changed into gaseous refrigerant while flowing through the evaporator 16.

However, in some cases, the liquid refrigerant flowing through the evaporator 16 may not be completely phase-changed into the gaseous refrigerant. That is, the refrigerant discharged from the evaporator 16 is a two-phase refrigerant, and may include gaseous refrigerant and liquid refrigerant.

The gaseous refrigerant has to be suctioned into the compressor 10. When the liquid refrigerant is suctioned into the compressor 12, the compressor 10 may be damaged.

Therefore, the refrigerant cycle 1 may further include an accumulator 18 that separates the liquid refrigerant from the refrigerant discharged from the evaporator 16 and suctions the gaseous refrigerant into the compressor 10. The accumulator 18 separates the liquid refrigerant and the gaseous refrigerant from the introduced two-phase refrigerant. The gaseous refrigerant may be discharged to the outside and the liquid refrigerant may be stored in the accumulator 18. In this embodiment, the accumulator 18 may be implemented by a known technique, and thus, detailed description thereof has been omitted.

A pressure loss of the refrigerant may occur while the refrigerant discharged from the evaporator 16 flows into the compressor 10 after flowing through the accumulator 18. The pressure of the refrigerant suctioned into the compressor 10 needs to be maintained within a reference pressure range. However, when the pressure loss of the refrigerant occurs, the pressure of the refrigerant suctioned into the compressor 10 is lowered, and thus, is out of the reference pressure range. This causes performance deterioration of the refrigerant cycle.

Therefore, the refrigerant cycle 1 according to an embodiment may further include a separation mechanism 30 that bypasses the gaseous refrigerant toward the compressor 10 after the refrigerant discharged from the evaporator 16 is separated into the gaseous refrigerant (see dashed line) and the liquid refrigerant (see solid line) before flowing into the accumulator 18. When the gaseous refrigerant separated from the liquid refrigerant by the separation mechanism 30 is directly suctioned into the compressor 10 without flowing through the accumulator 18, the pressure loss of the refrigerant is reduced. Therefore, the pressure loss of the refrigerant may be reduced in terms of the entire refrigerant suctioned into the compressor 10.

The separation mechanism 30 may include an inner pipe 310, and an outer pipe 330 disposed outside of the inner pipe 310. The outer pipe 330 may include a first portion 332, a second portion 333 that extends from the first portion 332 and having a diameter greater than a diameter of the first portion 332, and a third portion 334 that extends from the second portion 333.

An outlet pipe 21 of the evaporator 16 may be connected to the first portion 332. A diameter of the second portion 333 may increase from the first portion 332 toward the third portion 334.

When a vapor quality of the refrigerant in the evaporator 16 falls within a set or predetermined range and a mass velocity of the refrigerant falls within a set or predetermined range, a flow of the refrigerant discharged from the evaporator 16 may be an annular flow. In the case of the annular flow, the liquid refrigerant may flow along an inner circumferential surface of the pipe through which the refrigerant flows, and the gaseous refrigerant may flow along a central portion spaced apart from the inner circumferential surface of the pipe. That is, the refrigerant may flow in a state in which the liquid refrigerant is positioned around the gaseous refrigerant.

Therefore, in order to separate the gaseous refrigerant and the liquid refrigerant from the refrigerant flowing in an annular flow pattern, the inner pipe 310 may include a first portion 312 having a diameter less than a diameter of the first portion 332 of the outer pipe 330 and disposed coaxially with the first portion 332. The first portion 312 of the outer pipe 310 may be positioned inside of the third portion 334 of the outer pipe 330 and may be spaced apart from an inner circumferential surface of the third portion 334. As the diameter of the second portion 333 of the outer pipe 330 increases as a distance from the first portion 332 of the outer pipe 330 increases, a flow velocity may be reduced when the refrigerant flows from the first portion 332 to the second portion 333.

Among the refrigerants flowing through the outlet pipe 21, the liquid refrigerant flows along an inner circumferential surface of the outlet pipe 21. Thus, when the flow velocity of the liquid refrigerant flowing along the inner circumferential surface of the outlet pipe 21 is reduced in the second portion 333, the liquid refrigerant flows along inner circumferential surfaces of the second portion 333 and the third portion 334. That is, a phenomenon in which the liquid refrigerant flowing along the inner circumferential surface of the outlet pipe 21 scatters and flows into the first portion 312 together with the gaseous refrigerant may be minimized.

Among the refrigerants flowing along the outlet pipe 21, the gaseous refrigerant flows along a central portion of the outlet pipe 21. Thus, the gaseous refrigerant may flow into the first portion 312 of the inner pipe 310 while flowing from the outlet pipe 21 toward the second portion 333 and the third portion 334 of the outer pipe 330. The liquid refrigerant and the gaseous refrigerant may be separated by the separation mechanism 30. An inlet of the first portion 312 may be spaced apart from the second portion 333 of the outer pipe 330 in order to minimize the introduction of the liquid refrigerant into the first portion 312 of the inner pipe 310.

The inner pipe 310 may further include a second portion 314 that extends from the first portion 312 and having a diameter that increases as a distance from the first portion 312 increases. The inner pipe 310 may further include a third portion 316 that extends from the second portion 314.

A bypass pipe 24 configured to guide the gaseous refrigerant to the compressor 10 may be connected to the third portion 316. A center line of the first portion 332 of the outer pipe 330 may pass through the bypass pipe 24.

The outer pipe 330 may further include a fourth portion 336 to which the third portion 316 of the inner pipe 310 is coupled. An inner diameter of the fourth portion 336 of the outer pipe 330 may be greater than an inner diameter of the third portion 334 of the inner pipe 310. An outer diameter of the third portion 316 inserted into the fourth portion 336 may be greater than the inner diameter of the third portion 334. The inner diameter of the third portion 316 may be at least twice an inner diameter of the first portion 214.

In this embodiment, even if the liquid refrigerant flows into the first portion 312, the liquid refrigerant is phase-changed into the gaseous refrigerant in the process of flowing from the first portion 312 to the third portion 316. Alternatively, the liquid refrigerant may be evaporated in the process of flowing through the bypass pipe 24 and is thus phase-changed into the gaseous refrigerant.

A length of the third portion 334 of the outer pipe 330 may be longer than a sum of lengths of the first portion 312 and the second portion 314 of the inner pipe 310.

The third portion 334 may include a discharge pipe 335 through which the liquid refrigerant separated from the gaseous refrigerant flows. Of course, a small amount of gaseous refrigerant not separated from the liquid refrigerant may also flow through the discharge pipe 335.

In this embodiment, the flow rate of the refrigerant flowing into the bypass pipe 24 is greater than the flow rate of the refrigerant flowing into the discharge pipe 335 so that the effect of reducing the pressure loss of the refrigerant may be minimized. At least a portion of the discharge pipe 335 may be disposed to face the second portion 314 in order to prevent the liquid refrigerant separated from the gaseous refrigerant from flowing back toward the first portion 312.

A first pipe 22 configured to guide the refrigerant to the accumulator 18 may be connected to the discharge pipe 335. The first pipe 22 may be referred to as an "inlet side pipe" of the accumulator 18. A second pipe 23, which may be referred to as an "outlet side pipe" of the accumulator 18, may be connected to the compressor 10. The bypass pipe 24 may be connected to the second pipe 23.

As another example, the bypass pipe 24 may be connected to the compressor 10, and the second pipe 23 may be connected to the bypass pipe 24. As another further example, the bypass pipe 24 and the second pipe 23 may be connected to a common pipe, and the common pipe may be directly connected to the compressor 10.

A valve 26 may be provided in the bypass pipe 24. The valve 26 may be a valve that allows the refrigerant to flow into the bypass pipe 24 or blocks the flow, or a valve capable of controlling a flow rate of the refrigerant flowing into the bypass pipe 24.

When the compressor 10 is stopped, the liquid refrigerant may be stagnant in the evaporator 16 and the outlet pipe 21. In this state, if the valve 26 is immediately turned on when the compressor 10 is started, there is a high possibility that the liquid refrigerant will flow into the bypass pipe 24 even if the separation mechanism 30 is present.

Accordingly, in this embodiment, when the compressor 10 is started, the valve 26 is maintained in a closed state, and when the on condition of the valve 26 is satisfied, the valve 26 may be turned on. The case in which the on condition of the valve 26 is satisfied may be a case in which the compressor 10 is started and a set or predetermined time has elapsed, or a case in which the compressor 10 is started and the vapor quality of the refrigerant in the evaporator 16 is equal to or greater than a reference vapor quality.

When the vapor quality of the refrigerant in the evaporator 16 is less than a reference vapor quality in a state in which the valve 26 is turned on, the valve 26 may be turned off. When the vapor quality of the refrigerant is less than the reference vapor quality, a flow of the refrigerant may be a slug flow or an intermittent flow. In this case, there is a high possibility that the liquid refrigerant will flow into the first portion 312 from among the refrigerants flowing into the separation mechanism 30. Accordingly, in this embodiment, the valve 26 may be turned off when the vapor quality of the refrigerant in the evaporator 16 is less than the reference vapor quality. Although not limited thereto, the reference vapor quality may be less than 0.4.

On the other hand, according to this embodiment, the liquid refrigerant separated from the gaseous refrigerant in the separation mechanism 30 may flow into the first pipe 22 through the discharge pipe 335. Of course, the gaseous refrigerant that is not separated from the liquid refrigerant may also flow into the first pipe 22 through the discharge pipe 335.

The refrigerant flowing through the first pipe 22 flows into the accumulator 18. The refrigerant flowing into the accumulator 18 may be separated into the gaseous refrigerant and the liquid refrigerant, and the separated gaseous refrigerant may be suctioned into the compressor 10 after flowing through the second pipe 23. The gaseous refrigerant of the bypass pipe 24 may be suctioned into the compressor 10 together with the gaseous refrigerant of the second pipe 23.

According to this embodiment, as the gaseous refrigerant and the liquid refrigerant are separated from the refrigerant discharged from the evaporator 16, the gaseous refrigerant is bypassed and introduced into the compressor 10. Therefore, there is an advantage in that the pressure loss of the refrigerant suctioned into the compressor 10 is minimized. According to this embodiment, when the vapor quality of the refrigerant discharged from the evaporator 16 is low, it is possible to prevent the liquid refrigerant from flowing into the compressor 10 by restricting bypass of the refrigerant to the compressor 10.

Figure 3:
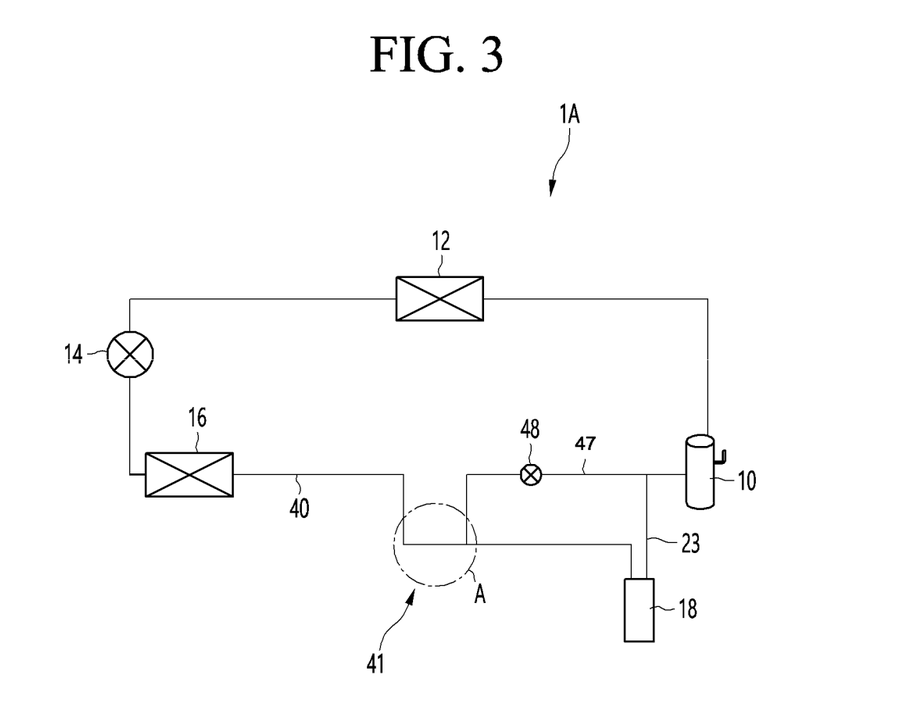
FIG. 3 is a schematic diagram of a refrigerant cycle according to another embodiment.
Figure 4:
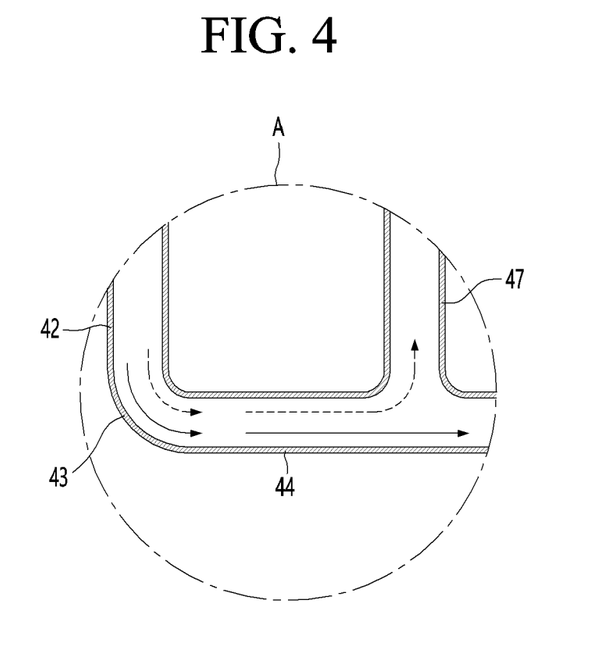
FIG. 4 is an enlarged view of portion A of FIG. 3.

FIG. 3 is a schematic diagram of a refrigerant cycle according to another embodiment. FIG. 4 is an enlarged view of portion A of FIG. 3.

This embodiment differs from the previous embodiment only in a separation mechanism. Therefore, only characteristic components of this embodiment will be described hereinafter.

Referring to FIGS. 3 and 4, a refrigerant cycle 1A according to this embodiment may include compressor 10, condenser 12, expander 14, evaporator 16, and accumulator 18. The refrigerant cycle 1A according to this embodiment may further include a separation mechanism 41 that bypasses the gaseous refrigerant toward the compressor 10 after separating the gaseous refrigerant and the liquid refrigerant from the refrigerant before the refrigerant discharged from the evaporator 16 flows into the accumulator 18.

When the gaseous refrigerant separated from the liquid refrigerant by the separation mechanism 41 is directly suctioned into the compressor 10 without flowing through the accumulator 18, the pressure loss of the refrigerant is reduced. Therefore, the pressure loss of the refrigerant may be reduced in terms of the entire refrigerant suctioned into the compressor 10.

The separation mechanism 41 may include a first pipe 42 that extends from an upper side to a lower side, a second pipe 43 bent from the first pipe 42, and a third pipe 44 that extends from the second pipe 43 in a horizontal direction. The separation mechanism 41 may further include a bypass pipe 47, at least a portion of which extends upward from the third pipe 44.

The first pipe 42 may be integrally formed with or connected to an outlet pipe 40 of the evaporator 16. The second pipe 43 may be rounded or inclined so that a flow direction of the refrigerant flowing through the first pipe 42 is changed.

The third pipe 44 may be connected to the accumulator 18. The bypass pipe 47 may be directly connected to the compressor 10, or may be connected to the second pipe 23 which is an outlet pipe of the accumulator 18.

When the refrigerant flows along the second pipe 43, the liquid refrigerant (see solid line) and the gaseous refrigerant (see dashed line) may be distinguished by the bent portion of the second pipe 43. The liquid refrigerant may flow horizontally along the third pipe 44 after flowing through the bent portion of the second pipe 43 while receiving centrifugal force.

On the other hand, as the gaseous refrigerant flowing through the second pipe 43 is relatively positioned above the liquid refrigerant, the gaseous refrigerant flowing into the third pipe 44 may flow into the bypass pipe 47 extending upward from the third pipe 44. The bypass pipe 47 may include a valve 48 having the same function as the valve described in the previous embodiment. The gaseous refrigerant that does not flow from the third pipe 44 to the bypass pipe 47 may flow into the accumulator 18 together with the liquid refrigerant.

Even in this embodiment, the liquid refrigerant and the gaseous refrigerant may be separated from the refrigerant discharged from the evaporator 16 by the separation mechanism 41. As the separated gaseous refrigerant is bypassed to the compressor 10, the pressure loss of the refrigerant suctioned into the compressor 10 may be reduced.

Figure 5:
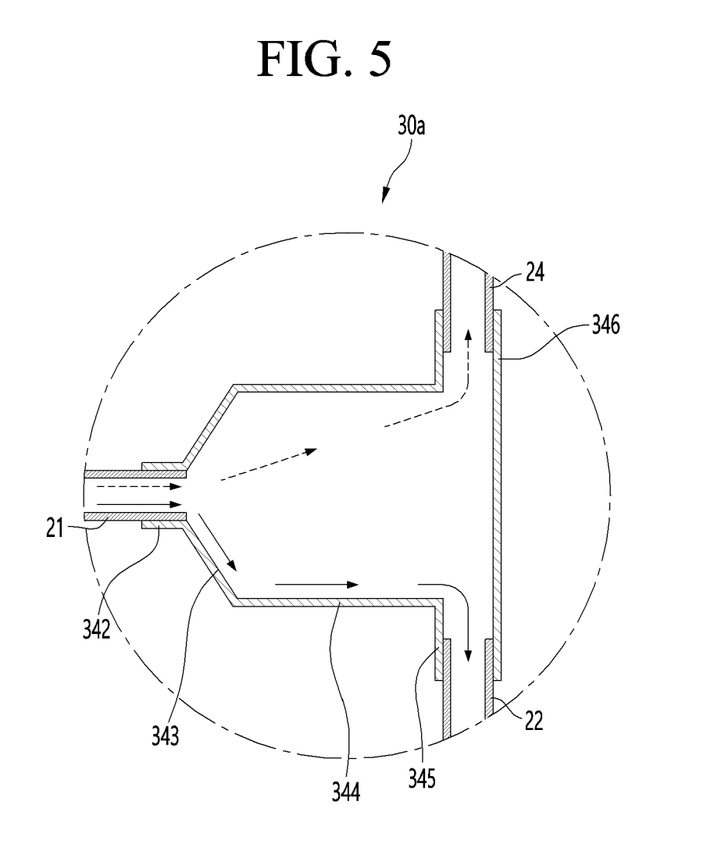
FIG. 5 is a cross-sectional view of a separation mechanism according to another embodiment.

FIG. 5 is a cross-sectional view of a separation mechanism according to another embodiment. This embodiment differs from the embodiment of FIG. 1 only in a separation mechanism. Therefore, only characteristic components of this embodiment will be described hereinafter.

Referring to FIGS. 1 and 5, a separation mechanism 30a according to this embodiment may include a first portion 342, a second portion 343 that extends from the first portion 342 and having a diameter greater than a diameter of the first portion 342, and a third portion 344 that extends from the second portion 343. An outlet pipe 21 of the evaporator 16 may be connected to the first portion 342. The diameter of the second portion 343 may increase from the first portion 342 toward the third portion 344.

When the vapor quality of the refrigerant in the evaporator 16 falls within a set or predetermined range and a mass velocity of the refrigerant falls within a set or predetermined range, the flow of the refrigerant discharged from the evaporator 16 may be an annular flow. On the other hand, when the vapor quality of the refrigerant falls within a set or predetermined range and the mass velocity of the refrigerant is lower than a lower limit of the set or predetermined range, the flow of the refrigerant may be a slug flow or a stratified-wavy flow. In the case of the slug flow or the stratified-wavy flow, when the refrigerant flows in the horizontal direction, the liquid refrigerant may be positioned at a lower side and the gaseous refrigerant may be positioned at an upper side.

In this embodiment, in consideration of flow characteristics of the refrigerant, the diameter of the second portion 343 may increase from the first portion 342 to the third portion 344, and the diameter of the third portion 344 is not limited, but may be three times or more times the diameter of the first portion 342.

In this case, a portion of the second portion 343 may be inclined downward as the distance from the first portion 342 increases. Another portion of the second portion 343 may be inclined upward as the distance from the first portion 342 increases. A portion of the third portion 344 may be positioned lower than the first portion 342, and another portion of the third portion 344 may be positioned higher than the first portion 342.

According to this structure, when the refrigerant discharged from the evaporator 16 flows from the first portion 342 to the second portion 343, a flow velocity is lowered, and thus, the flow of the refrigerant may be a slug flow or a stratified-wavy flow.

When the refrigerant flows through the second portion 343, the liquid refrigerant (see solid line) flows to the third portion 344 along a lower surface of the second portion 343 due to gravity. Accordingly, the liquid refrigerant and the gaseous refrigerant (see dashed line) may be separated.

The separation mechanism 30a may further include a first outlet pipe 345 that extends downward from the third portion 344, and a second outlet pipe 346 that extends upward from the third portion 344. The liquid refrigerant may flow along the lower side of the third portion 344 and may be discharged through the first outlet pipe 345. First pipe 22 connected to the accumulator 18 may be connected to the first outlet pipe 345.

The gaseous refrigerant may move upward in the third portion 344 and may be discharged through the second outlet pipe 346. Bypass pipe 24 may be connected to the second outlet pipe 346.

Even in this embodiment, the liquid refrigerant and the gaseous refrigerant may be separated from the refrigerant discharged from the evaporator 16 by the separation mechanism 30a. As the separated gaseous refrigerant is bypassed to the compressor 10, the pressure loss of the refrigerant suctioned into the compressor 10 may be reduced. In this embodiment, even when the vapor quality of the refrigerant is low, the liquid refrigerant and the gaseous refrigerant may be separated, thereby reducing the pressure loss of the refrigerant suctioned into the compressor 10.

Figure 6:
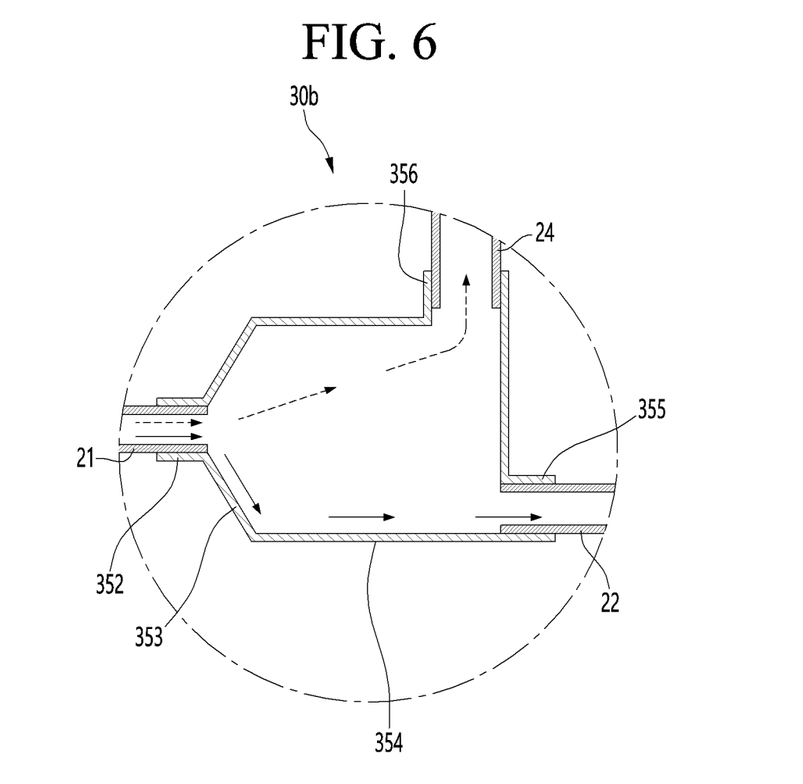
FIG. 6 is a cross-sectional view of a separation mechanism according to still another embodiment.

FIG. 6 is a cross-sectional view of a separation mechanism according to still another embodiment. This embodiment differs from the previous embodiment only in a separation mechanism. Therefore, only characteristic components of this embodiment will be described hereinafter.

Referring to FIGS. 1 and 6, a separation mechanism 30b according to this embodiment may include a first portion 352, a second portion 353 that extends from the first portion 352 and having a diameter greater than a diameter of the first portion 352, and a third portion 354 that extends from the second portion 353. Basic shapes of the first to third portions 352, 353, and 354 may be the same as shapes of the first to third portions 342, 343, 344 of the previous embodiment.

The separation mechanism 30b of this embodiment may further include a first outlet pipe 355 that extends from a lower side of the third portion 354 in a horizontal direction, and a second outlet pipe 356 that extends upward from the third portion 354. The liquid refrigerant (see solid line) may flow along a lower side of the third portion 354 and may be discharged through the first outlet pipe 355. First pipe 22 connected to the accumulator 18 may be connected to the first outlet pipe 355.

The gaseous refrigerant (see dashed line) may move upward in the third portion 354 and may be discharged through the second outlet pipe 356. Bypass pipe 24 may be connected to the second outlet pipe 356.

In this embodiment, when the first outlet pipe 355 extends from the third portion 354 in the horizontal direction, the pressure loss of the liquid refrigerant flowing from the third portion 354 to the first outlet pipe 355 may be reduced. Even in this embodiment, the liquid refrigerant and the gaseous refrigerant may be separated from the refrigerant discharged from the evaporator 16 by the separation mechanism 30b. As the separated gaseous refrigerant is bypassed to the compressor 10, the pressure loss of the refrigerant suctioned into the compressor 10 may be reduced.

Figure 7:
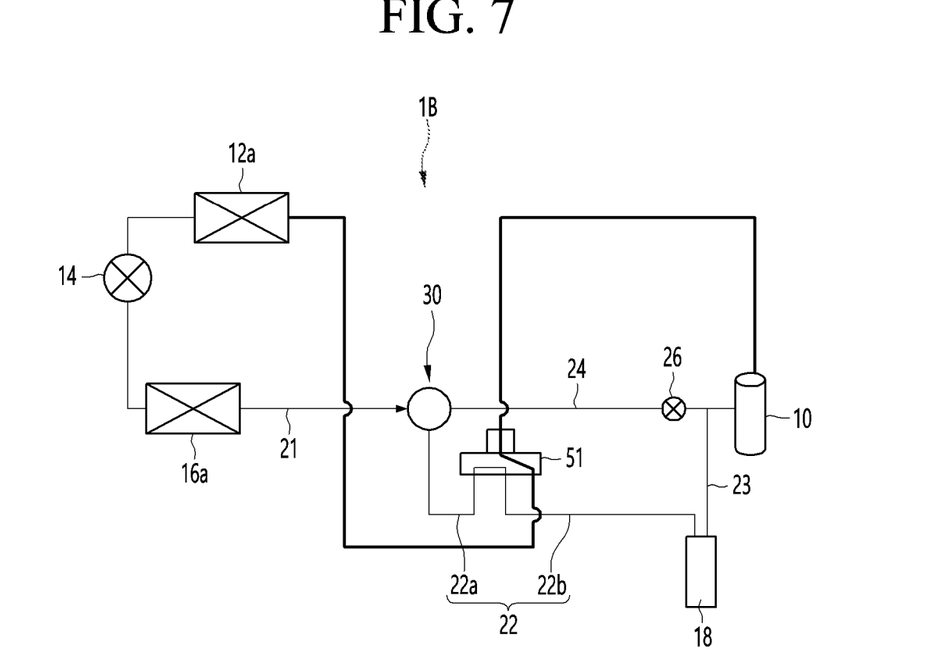
FIG. 7 is a schematic diagram of a refrigerant cycle according to still another embodiment.

FIG. 7 is a schematic diagram of a refrigerant cycle according to still another embodiment. This embodiment differs from the embodiment of FIG. 1 in that the refrigerant cycle further includes a four-way valve. Therefore, only characteristic components of this embodiment will be described hereinafter.

Referring to FIG. 7, a refrigerant cycle 1B according to this embodiment may include compressor 10, a four-way valve 51 that controls a flow direction of a refrigerant compressed by the compressor 10, a first heat exchanger 12a, expander 14, a second heat exchanger 16a, and separation mechanism 30. The first heat exchanger 12a may be used as a condenser during a cooling operation and may be used as an evaporator during a heating operation. The second heat exchanger 16a may be used as an evaporator during a cooling operation and may be used as a condenser during a heating operation. The first heat exchanger 12a may be, for example, an outdoor heat exchanger, and the second heat exchanger 16a may be, for example, an indoor heat exchanger.

Hereinafter, the refrigerant cycle will be described based on refrigerant flow during the cooling operation.

The refrigerant discharged from the compressor 10 by the four-way valve 51 may flow to the first heat exchanger 12a. The refrigerant flowing to the first heat exchanger 12a may be condensed, flow through the expander 14, and then flow through the second heat exchanger 16a.

The separation mechanism 30 may separate liquid refrigerant and gaseous refrigerant from the refrigerant discharged from the second heat exchanger 16a. In this embodiment, the separation mechanism 30 may have the same structure as the separation mechanism described in the embodiment of FIG. 1. However, the separation mechanism 30 may also have the same structure as the separation mechanisms described in the other embodiments.

First pipe 22 through which the liquid refrigerant separated by the separation mechanism 30 flows may be connected to the separation mechanism 30. The first pipe 22 may include a first connecting pipe 22a that connects the separation mechanism 30 to the four-way valve 51, and a second connecting pipe 22b that connects the four-way valve 51 to the accumulator 18.

Bypass pipe 24 through which the liquid refrigerant and the separated gaseous refrigerant flow may be connected to the separation mechanism 30. Valve 26 may be provided in the bypass pipe 24. As a connection relationship of the bypass pipe 24 and operation of the valve 26 are the same as those of the embodiment of FIG. 1, repetitive description thereof has been omitted.

In this embodiment, the gaseous refrigerant separated by the separation mechanism 30 may be suctioned into the compressor 10 after bypassing the four-way valve 51 and the accumulator 18, thereby minimizing the pressure loss of the refrigerant. On the other hand, the valve 26 may be maintained in a closed state during the heating operation.

Figure 8:
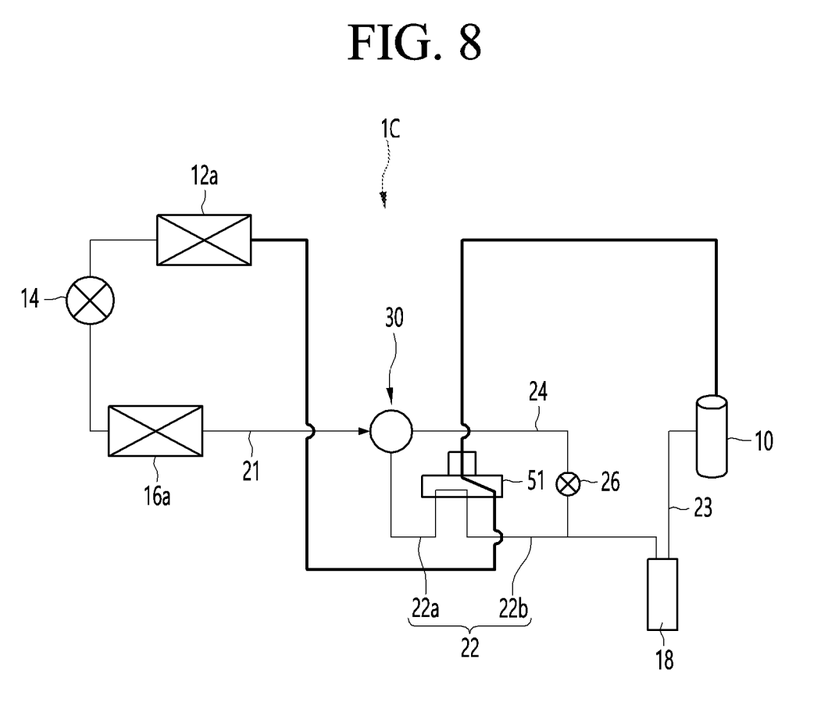
FIG. 8 is a schematic diagram of a refrigerant cycle according to still another embodiment.

FIG. 8 is a schematic diagram of a refrigerant cycle according to still another embodiment. This embodiment differs from the previous embodiment only in a connection position of a bypass pipe. Therefore, only characteristic components of this embodiment will be described hereinafter.

Referring to FIG. 8, a refrigerant cycle 1C according to this embodiment may include compressor 10, four-way valve 51, first heat exchanger 12a, expander 14, second heat exchanger 16a, and separation mechanism 30. During a cooling operation, refrigerant discharged from the compressor 10 by the four-way valve 51 may flow to the first heat exchanger 12a. The refrigerant flowing to the first heat exchanger 12a may be condensed, flow through the expander 14, and then flow through the second heat exchanger 16a.

The separation mechanism 30 may separate liquid refrigerant and gaseous refrigerant from the refrigerant discharged from the second heat exchanger 16a. First pipe 22 through which the liquid refrigerant separated by the separation mechanism 30 flows may be connected to the separation mechanism 30. The first pipe 22 may include first connecting pipe 22a that connects the separation mechanism 30 to the four-way valve 51, and second connecting pipe 22b that connects the four-way valve 51 to the accumulator 18.

Bypass pipe 24 through which the liquid refrigerant and the separated gaseous refrigerant flow may be connected to the separation mechanism 30. A valve 26 may be provided in the bypass pipe 24. The bypass pipe 24 may be connected to the second connecting pipe 22b. When the bypass pipe 24 is connected to the second connecting pipe 22b, the valve 26 may be omitted.

Figure 9:
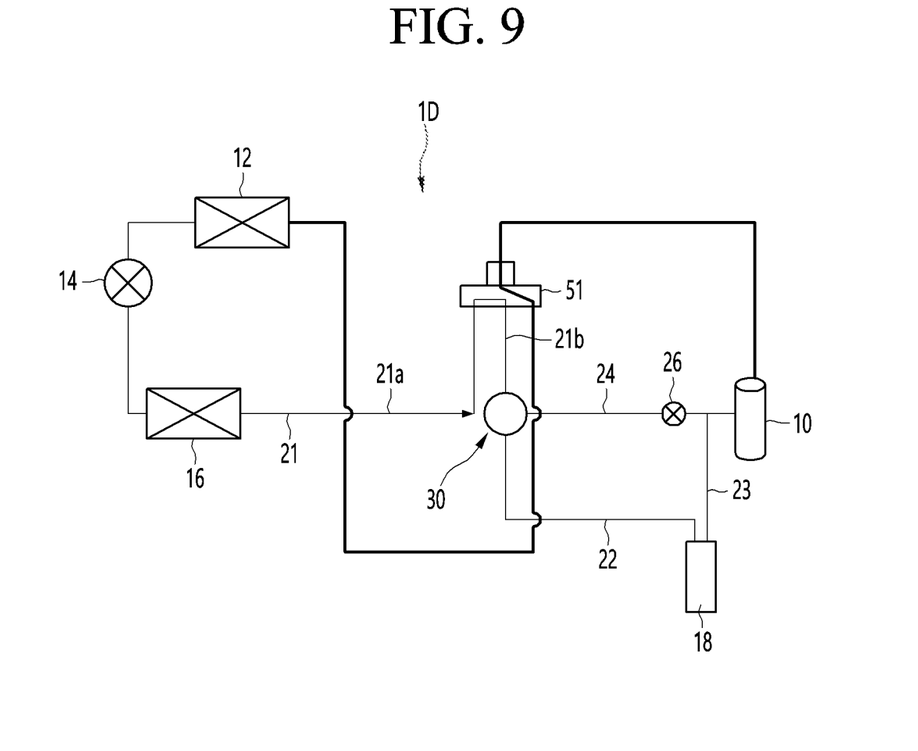
FIG. 9 is a schematic diagram of a refrigerant cycle according to yet another embodiment.

FIG. 9 is a schematic view of a refrigerant cycle according to yet another embodiment. This embodiment differs from the embodiment of FIG. 7 only in a connection position of a bypass pipe. Therefore, only characteristic components of this embodiment will be described hereinafter.

Referring to FIG. 9, a refrigerant cycle 1D according to this embodiment may include compressor 10, four-way valve 51, first heat exchanger 12a, expander 14, second heat exchanger 16a, and separation mechanism 30. During a cooling operation, refrigerant discharged from the compressor 10 by the four-way valve 51 may flow to the first heat exchanger 12a. The refrigerant flowing to the first heat exchanger 12a may be condensed, flow through the expander 14, and then flow through the second heat exchanger 16a. The separation mechanism 30 may separate liquid refrigerant and gaseous refrigerant from the refrigerant discharged from the second heat exchanger 16a.

Outlet pipe 21 of the second heat exchanger 16a may be connected to a first connecting pipe 21a. The first connecting pipe 21a may be connected to the four-way valve 51. A second connecting pipe 21b may be connected to the four-way valve 51. The separation mechanism 30 may be connected to the second connecting pipe 21b.

Bypass pipe 24 through which the liquid refrigerant and the separated gaseous refrigerant flow may be connected to the separation mechanism 30. A valve 26 may be provided in the bypass pipe 24. First pipe 22 configured to guide the liquid refrigerant to the accumulator 18 may be connected to the separation mechanism 30.

This embodiment provides a device having a refrigerant cycle, in which gaseous refrigerant and liquid refrigerant are separated from refrigerant discharged from an evaporator, and the gaseous refrigerant is bypassed to flow into a compressor, thereby minimizing the pressure loss of the refrigerant suctioned into the compressor. Optionally or additionally, this embodiment provides a device having a refrigerant cycle, in which bypass of a refrigerant to a compressor is restricted when the vapor quality of the refrigerant discharged from an evaporator is low.

According to embodiments disclosed herein a device having a refrigerant cycle may include a compressor configured to compress a refrigerant, a condenser configured to condense the refrigerant compressed by the compressor, an expander configured to expand the refrigerant condensed by the condenser, and an evaporator configured to evaporate the refrigerant expanded by the expander. The device may further include a separation mechanism connected to an outlet pipe of the evaporator to separate liquid refrigerant and gaseous refrigerant from refrigerant discharged from the evaporator. The device may further include a bypass pipe configured to guide the gaseous refrigerant separated from the liquid refrigerant by the separation mechanism to the compressor.

The device may further include a first pipe connected to the separation mechanism and through which the liquid refrigerant discharged from the separation mechanism flows. The device may further include an accumulator connected to the first pipe to separate the gaseous refrigerant, which is not separated from the liquid refrigerant by the separation mechanism, from the liquid refrigerant and discharge the separated gaseous refrigerant. The device may further include a second pipe configured to guide the gaseous refrigerant discharged from the accumulator to the compressor.

The device may further include a valve that controls a refrigerant flow of the bypass pipe. When the compressor is started from a stopped state, the valve may maintain a closed state. When an on condition of the valve is satisfied, the valve may be turned on.

A case in which the on condition of the valve is satisfied may be a case in which the compressor is started and a set or predetermined time has elapsed, or a case in which the compressor is started and a vapor quality of the refrigerant in the evaporator is equal to or greater than a reference vapor quality.

The separation mechanism may include an outer pipe. The separation mechanism may further include an inner pipe disposed inside of the outer pipe.

The outer pipe may include a first portion connected to the outlet pipe of the evaporator. The outer pipe may further include a second portion that extends from the first portion and having a diameter that increases as a distance from the first portion increases. The outer pipe may further include a third portion that extends from the second portion.

The inner pipe may include a first part or portion positioned in the third portion of the outer pipe, having a diameter less than a diameter of the first portion of the outer pipe, and disposed coaxially with the first portion of the outer pipe. The inner pipe may further include a second part or portion that extends from the first part and having a diameter that increases as a distance from the first part increases. The inner pipe may further include a third part or portion that extends from the second part.

The third portion may include a discharge pipe connected to the first pipe and extending downward so that the liquid refrigerant separated from the gaseous refrigerant is discharged. The bypass pipe may be connected to the third part. An inlet of the first part may be spaced apart from the second portion.

The separation mechanism may include a first pipe connected to the outlet pipe of the evaporator and extending from an upper side to a lower side. The separation mechanism may further include a second pipe bent from the first pipe. The separation mechanism may further include a third pipe extending from the second pipe in a horizontal direction and connected to the accumulator. At least a part or portion of the bypass pipe may extend upward from the third pipe.

The separation mechanism may include a first portion connected to the outlet pipe of the evaporator. The separation mechanism may further include a second portion that extends from the first portion and having a diameter greater than a diameter of the first portion. The separation mechanism may further include a third portion that extends from the second portion.

The separation mechanism may further include a first discharge pipe which extends from the third portion and through which the liquid refrigerant is discharged. The separation mechanism may further include a second discharge pipe which extends from the third portion and through which the gaseous refrigerant is discharged.

The second discharge pipe may be positioned higher than the first discharge pipe, and the first discharge pipe may extend downward from the third portion. The second discharge pipe may extend from a lower side of the third portion in a horizontal direction, or may extend downward from the third portion.

A part or portion of the second portion may be inclined downward as a distance from the first portion increases. A part or portion of the third portion may be positioned lower than the first portion and another part or portion of the third portion may be positioned higher than the first portion.

According to embodiments disclosed herein, a device having a refrigerant cycle may include a compressor configured to compress a refrigerant, a four-way valve configured to control a flow direction of the refrigerant compressed by the compressor, a first heat exchanger configured to condense the refrigerant that is compressed by the compressor and passes through the four-way valve, an expander configured to expand the refrigerant condensed by the condenser, a second heat exchanger configured to evaporate the refrigerant expanded by the expander, and a separation mechanism connected to an outlet pipe of the second heat exchanger to separate liquid refrigerant and gaseous refrigerant from the refrigerant discharged from the second heat exchanger. The device may further include a bypass pipe configured to guide the gaseous refrigerant separated from the liquid refrigerant by the separation mechanism. The device may further include a first connecting pipe connected to the separation mechanism and connected to the four-way valve and through which the liquid refrigerant discharged from the separation mechanism flows. The device may further include a second connecting pipe connected to the four-way valve and through which the liquid refrigerant passing through the four-way valve flows. The device may further include an accumulator connected to the second pipe to separate the gaseous refrigerant, which is not separated from the liquid refrigerant by the separation mechanism, from the liquid refrigerant and discharge the separated gaseous refrigerant. The device may further include a pipe configured to guide the gaseous refrigerant discharged from the accumulator to the compressor.

The bypass pipe may be connected to the compressor. The bypass pipe may be connected to the second connecting pipe.

According to embodiments disclosed herein, a device having a refrigerant cycle may include a compressor configured to compress a refrigerant, a four-way valve configured to control a flow direction of the refrigerant compressed by the compressor, a first heat exchanger configured to condense the refrigerant that is compressed by the compressor and passes through the four-way valve, an expander configured to expand the refrigerant condensed by the condenser, a second heat exchanger configured to evaporate the refrigerant expanded by the expander, a separation mechanism configured to separate liquid refrigerant and gaseous refrigerant from the refrigerant that is discharged from the second heat exchanger and passes through the four-way valve, a bypass pipe configured to guide the gaseous refrigerant separated from the liquid refrigerant by the separation mechanism to the compressor, an accumulator connected to the separation mechanism to separate the gaseous refrigerant, which is not separated from the liquid refrigerant by the separation mechanism, from the liquid refrigerant and discharge the separated gaseous refrigerant; and a pipe configured to guide the gaseous refrigerant discharged from the accumulator to the compressor.

The description herein is merely illustrative of the technical idea, and various modifications and changes may be made thereto by those skilled in the art without departing from the essential characteristics of embodiments. Therefore, embodiments are not intended to limit the technical spirit but to describe the technical idea, and the technical spirit is not limited by these embodiments.

The scope of protection should be interpreted by the appending claims, and all technical ideas within the scope of equivalents should be construed as falling within the scope.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device having a refrigerant cycle, the device comprising:
    a compressor configured to compress a refrigerant;
    a condenser configured to condense the refrigerant compressed by the compressor;
    an expander configured to expand the refrigerant condensed by the condenser;
    an evaporator configured to evaporate the refrigerant expanded by the expander;
    a separation device connected to an outlet pipe of the evaporator to separate liquid refrigerant and a first portion of gaseous refrigerant from the refrigerant discharged from the evaporator;
    a bypass pipe configured to guide the first portion gaseous refrigerant separated from the liquid refrigerant by the separation device to the compressor;
    a first refrigerant pipe connected to the separation device and through which the liquid refrigerant discharged from the separation device flows;
    an accumulator connected to the first refrigerant pipe to separate a second portion of gaseous refrigerant, which is not separated from the liquid refrigerant by the separation device, from the liquid refrigerant and discharge the second portion of gaseous refrigerant; and
    a second refrigerant pipe configured to guide the second portion of gaseous refrigerant discharged from the accumulator to the compressor, wherein the separation device includes:
        a first pipe connected to the outlet pipe of the evaporator and extending from an upper side to a lower side;
        a second pipe bent from the first pipe; and
        a third pipe that extends from the second pipe in a horizontal direction and connected to the accumulator, and wherein at least a portion of the bypass pipe extends upward from the third pipe.

2. The device of claim 1, further comprising a valve configured to control a refrigerant flow in the bypass pipe, wherein, when the compressor is started from a stopped state, the valve maintains a closed state, and when an on condition of the valve is satisfied, the valve is turned on.

3. The device of claim 2, wherein a case in which the on condition of the valve is satisfied is a case in which the compressor is started and a predetermined time has elapsed, or a case in which the compressor is started and a vapor quality of the refrigerant in the evaporator is equal to or greater than a reference vapor quality.

4. A device having a refrigerant cycle, the device comprising:
   a compressor configured to compress a refrigerant;
   a condenser configured to condense the refrigerant compressed by the compressor;
   an expander configured to expand the refrigerant condensed by the condenser;
   an evaporator configured to evaporate the refrigerant expanded by the expander;
   a separation device connected to an outlet pipe of the evaporator to separate liquid refrigerant and a first portion of gaseous refrigerant from the refrigerant discharged from the evaporator;
   a bypass pipe configured to guide the first portion gaseous refrigerant separated from the liquid refrigerant by the separation device to the compressor;
   a first refrigerant pipe connected to the separation device and through which the liquid refrigerant discharged from the separation device flows;
   an accumulator connected to the first refrigerant pipe to separate a second portion of gaseous refrigerant, which is not separated from the liquid refrigerant by the separation device, from the liquid refrigerant and discharge the second portion of gaseous refrigerant; and
   a second refrigerant pipe configured to guide the second portion of gaseous refrigerant discharged from the accumulator to the compressor, wherein the separation device includes an outer pipe, and an inner pipe disposed inside of the outer pipe, wherein the outer pipe includes a first portion connected to the outlet pipe of the evaporator, a second portion that extends from the first portion and having a diameter that increases as a distance from the first portion increases, and a third portion that extends from the second portion, wherein at least a portion of the inner pipe is positioned in the third portion, wherein the inner pipe includes:
      a first portion positioned in the third portion of the outer pipe, having a diameter less than a diameter of the first portion of the outer pipe, and disposed coaxially with the first portion of the outer pipe;
      a second portion that extends from the first portion and having a diameter that increases as a distance from the first portion increases; and
      a third portion that extends from the second portion, wherein the third portion of the outer pipe includes a discharge pipe connected to the first refrigerant pipe and extending downward so that the liquid refrigerant separated from the first portion of gaseous refrigerant is discharged, and wherein the bypass pipe is connected to the third portion of the outer pipe.

5. The device of claim 4, wherein a center line of the first portion of the outer pipe passes through the bypass pipe.

6. The device of claimer 4, wherein an inlet of the first portion of the inner pipe is spaced apart from the second portion of the outer pipe.

7. A device having a refrigerant cycle, the device comprising:
   a compressor configured to compress a refrigerant;
   a condenser configured to condense the refrigerant compressed by the compressor;
   an expander configured to expand the refrigerant condensed by the condenser;
   an evaporator configured to evaporate the refrigerant expanded by the expander;
   a separation device connected to an outlet pipe of the evaporator to separate liquid refrigerant and a first portion of gaseous refrigerant from the refrigerant discharged from the evaporator;
   a bypass pipe configured to guide the first portion gaseous refrigerant separated from the liquid refrigerant by the separation device to the compressor;
   a first refrigerant pipe connected to the separation device and through which the liquid refrigerant discharged from the separation device flows;
   an accumulator connected to the first refrigerant pipe to separate a second portion of gaseous refrigerant, which is not separated from the liquid refrigerant by the separation device, from the liquid refrigerant and discharge the second portion of gaseous refrigerant; and
   a second refrigerant pipe configured to guide the second portion of gaseous refrigerant discharged from the accumulator to the compressor, wherein the separation device includes:
      a first portion connected to the outlet pipe of the evaporator;
      a second portion that extends from the first portion and having a diameter greater than a diameter of the first portion;
      a third portion that extends from the second portion;
      a first discharge pipe which extends from the third portion and through which the liquid refrigerant is discharged; and
      a second discharge pipe which extends from the third portion and through which the first portion of gaseous refrigerant is discharged.

8. The device of claim 7, wherein the second discharge pipe is positioned higher than the first discharge pipe.

9. The device of claim 7, wherein the second discharge pipe extends upward from the third portion.

10. The device of claim 7, wherein the first discharge pipe extends from a lower side of the third portion in a horizontal direction or extends downward from the third portion.

11. The device of claim 7, wherein a portion of the second portion is inclined downward as a distance from the first portion increases.

12. The device of claim 7, wherein a first side of the third portion is positioned lower than the first portion and a second side of the third portion is positioned higher than the first portion.

* * * * *